(12) United States Patent
Fukumoto et al.

(10) Patent No.: US 7,456,368 B2
(45) Date of Patent: Nov. 25, 2008

(54) SAFETY SWITCH

(75) Inventors: Tetsuya Fukumoto, Kusatsu (JP); Yoichi Shude, Kusatsu (JP); Shigeki Nakanishi, Kawasaki (JP); Shunkichi Sasaki, Osaka (JP); Hidemitsu Takenaka, Otsu (JP); Kenji Shimazu, Moriyama (JP)

(73) Assignee: Omron Corporation, Kyoto-Shi (JP)

( * ) Notice: Subject to any disclaimer, the term of this patent is extended or adjusted under 35 U.S.C. 154(b) by 108 days.

(21) Appl. No.: 11/708,688

(22) Filed: Feb. 21, 2007

(65) Prior Publication Data

US 2007/0205089 A1 Sep. 6, 2007

(30) Foreign Application Priority Data

Feb. 23, 2006 (JP) ............................. P2006-047010

(51) Int. Cl.
*H01H 27/00* (2006.01)
(52) U.S. Cl. ..................................... 200/43.04; 200/329
(58) Field of Classification Search ... 200/43.04–43.22, 200/318, 318.1, 320, 323–325, 329, 334, 200/17 R
See application file for complete search history.

(56) References Cited

U.S. PATENT DOCUMENTS

| | | | | |
|---|---|---|---|---|
| 3,643,046 A * | 2/1972 | Zdanys et al. | ............... | 200/430 |
| 3,694,595 A * | 9/1972 | Horecky | .................. | 200/61.76 |
| 3,947,391 A * | 3/1976 | Lutzenberger | ............ | 200/16 D |
| 3,971,903 A * | 7/1976 | Wilentchik | ................ | 200/16 C |
| 4,072,834 A * | 2/1978 | Godfrey | .................... | 200/16 C |
| 4,104,606 A * | 8/1978 | DeWitt | ........................ | 338/198 |
| 4,268,728 A * | 5/1981 | Rose | ......................... | 200/16 R |
| 4,352,966 A * | 10/1982 | English et al. | ............ | 200/16 D |
| 4,395,608 A * | 7/1983 | Eicker et al. | ................. | 200/533 |
| 4,533,904 A * | 8/1985 | Steinman, Jr. | ............... | 340/521 |
| 4,851,621 A * | 7/1989 | Borchardt et al. | ......... | 200/50.05 |
| 4,857,678 A * | 8/1989 | Lipp | ......................... | 200/16 R |
| 4,918,273 A * | 4/1990 | Stokoe et al. | ................ | 200/550 |
| 4,947,054 A * | 8/1990 | Flowers et al. | .............. | 307/125 |
| 5,464,954 A * | 11/1995 | Kimura et al. | ........... | 200/61.62 |
| 5,473,127 A * | 12/1995 | Falcon et al. | ............. | 200/43.04 |
| 5,622,253 A * | 4/1997 | Wecke et al. | ............. | 200/43.07 |
| 5,875,886 A * | 3/1999 | Elster | ......................... | 200/331 |
| 6,194,674 B1 * | 2/2001 | Fukui | ....................... | 200/43.04 |
| 6,268,574 B1 * | 7/2001 | Edens | ..................... | 200/43.04 |
| 7,223,927 B2 * | 5/2007 | Poyner | .................... | 200/43.04 |
| 7,339,125 B2 * | 3/2008 | Day | ......................... | 200/43.04 |

FOREIGN PATENT DOCUMENTS

| | | |
|---|---|---|
| JP | 10-302580 | 11/1998 |
| JP | 2004-353849 | 12/2004 |

* cited by examiner

*Primary Examiner*—Michael A Friedhofer
*Assistant Examiner*—Lisa N Klaus
(74) *Attorney, Agent, or Firm*—Foley & Lardner LLP

(57) ABSTRACT

In order to perform maintenance of a working robot, a worker pulls a handle of a slider and moves the slider backward to thereby withdraw a slider fitting portion from a fitting hole portion and withdraw an actuator from an operating portion of a door switch. In this case, a key inserted into a key hole of a lock is rotated through 90° to vertically orient an interference protruding portion to thereby prevent fitting of the slider fitting portion into the fitting hole portion. Only in this state, the key can be withdrawn from the key hole of the lock.

8 Claims, 18 Drawing Sheets

SAFETY SWITCH

BACKGROUND OF THE INVENTION

This application claims priority from Japanese patent application P2006-047010 filed Feb. 23, 2006. The entire content of the aforementioned application is incorporated herein by reference.

1. Field of the Invention

The present invention relates to a safety switch for stopping driving of a machine such as a working robot when the switch senses opening of an opening/closing door for opening and closing a doorway of a working space in which the machine is disposed.

2. Description of the Related Art

There is a working space where a machine such as a working robot is fenced near its driving range to secure safety around the space. An opening/closing door of a doorway of such a working space is mounted with a safety switch for stopping the machine when the switch senses opening of the opening/closing door so as to secure safety of a worker who has entered the space.

As this type of safety switch, there is a conventional one in which an actuator is inserted into a safety switch main body to allow operation of a working robot when an opening/closing door is closed while the actuator is withdrawn away from the safety switch main body to stop the machine when the opening/closing door is opened, for example (refer to Japanese Patent Application Laid-Open No. 10-302580).

On the other hand, in order to prevent operation of the machine even if the opening/closing door is closed accidentally when the worker is remaining in the working space, there are developed safety switches in which an actuator is locked in a housed state so as not to protrude toward a safety switch main body so that the actuator cannot be inserted into the safety switch main body when the opening/closing door is merely closed.

As this type of safety switch, there is a conventional one including: an actuator provided to an opening/closing door; a safety switch main body having an insertion hole which is provided in such a position as to face the actuator and into which the actuator is inserted when the opening/closing door closes a doorway of a working space and an engaging means capable of being engaged with the actuator inserted into the insertion hole and structured so that the engaged state is cancelled when the engaged actuator moves to go out of the insertion hole; a closing piece for turning between a closing position for closing the insertion hole and an opening position for opening the insertion hole; and a locking mechanism (padlock) for locking the closing piece in the closing position (refer to Japanese Patent Application Laid-Open No. 2004-353849).

In this safety switch, if the insertion hole of the safety switch main body is closed with the closing piece, entry of the actuator into the safety switch main body is restricted. In this way, it is possible to prevent the actuator and the safety switch main body from becoming engaged to erroneously allow the machine to operate even when the opening/closing door is closed by mistake. By locking the locking mechanism, it is possible to reliably fix the closing piece in the closing position.

In the above-described prior-art safety switch, it is necessary to close the insertion hole of the safety switch main body with the closing piece so as to restrict entry of the actuator into the safety switch main body. Moreover, in order to reliably fix the closing piece in the closing position, locking is carried out by using the locking mechanism and the closing piece for turning between the closing position for closing the insertion hole and the opening position for opening the insertion hole and the locking mechanism (padlock) for locking the closing piece in the closing position are necessary. In a state in which the insertion hole is opened by the closing piece, the locking mechanism is carried around by the worker or stored in a proper storage space, which is inherently inconvenient since keeping and management of the locking mechanism are bothersome and the locking mechanism cannot be used because no one knows where it is stored or who is keeping it when it is actually necessary. Moreover, parts are many for the safety switch, which results in high cost.

With the above points in view, it is an object of the present invention to provide a safety switch which eliminates bothersome keeping and management of the locking mechanism and which requires fewer parts to reduce cost.

SUMMARY OF THE INVENTION

To achieve the above objects, a safety switch of the present invention includes an actuator provided to an opening/closing door for opening and closing a doorway of a working space where a machine is disposed and a door switch provided to an edge portion of the doorway and having a connection contact of a switch portion which is switched in response to entry of the actuator into an operating portion to allow operation of the machine when the opening/closing door closes the doorway, wherein the safety switch includes a slider for reciprocating toward the door switch while retaining the actuator to cause the actuator to enter the operating portion and to withdraw the actuator from the operating portion and a slide key device integrally formed of a slider movement preventing member for controlling movement of the slider and a lock for controlling the slider movement preventing member by operating a key, and wherein the slide key device is configured to select movement prevention for preventing movement of the slider with the slider movement preventing member by operating the lock with the key or cancellation of the movement prevention.

With this structure, when a worker tries to enter the working space so as to perform maintenance of the machine, power supply to the machine is interrupted to allow opening of the opening/closing door. Then, the worker moves the slider backward to thereby withdraw the actuator from the operating portion. In this case, the slide key device can prevent movement of the slider with the slider movement preventing member by operating the lock with the key to prevent entry of the actuator into the operating portion.

In this way, when the slider is moved backward to withdraw the actuator from the operating portion, it is possible to prevent movement of the slider with the slide key device to thereby prevent entry of the actuator into the operating portion. As a result, it is impossible to actuate the door switch and to bring the machine into operation and therefore it is possible to secure safety of the worker.

Therefore, in case of the safety switch according to the invention, the closing piece which is necessary for the priorart safety switch so as to prevent movement of the actuator so that the machine does not operate even if the opening/closing door is closed accidentally when the worker is remaining in the working space and the locking mechanism (padlock) for locking the closing piece in the closing position become unnecessary. As a result, the parts are few for the safety switch and the cost can be reduced.

The slide key device in the safety switch according to the invention allows withdrawal of the key from the lock only in the state of movement prevention.

Therefore, it is possible to withdraw the key from the key hole of the lock only in an entry prevention state of the slider key device (movement prevention state of the slider).

Moreover, because it is possible to withdraw the key from the lock only when the slider is moved backward to prevent entry of the actuator into the operating portion, it is possible to prevent carrying away of the key by mistake.

In the above safety switch according to the invention, the slider has a slider fitting portion at its tip portion, and the slide key device has a guide provided to the door switch and having a fitting hole portion and the lock provided to the guide, and wherein the lock rotatably retains a slide lock as the slider movement preventing member at its movable portion and is configured to rotate the slide lock in the fitting hole portion by a predetermined amount of rotating operation of the key inserted into a key hole of the lock to change a shape of the fitting hole portion to thereby select fitting of the slider fitting portion into the fitting hole portion or prevention of the fitting and to allow the key to be withdrawn only in the case of prevention of the fitting of the slider fitting portion.

With this structure, to close the opening/closing door and operate the machine in the working space in the working space, the key inserted into the key hole of the lock is rotated through a predetermined angle (e.g., 90°) to thereby rotate the slide lock through a predetermined angle (e.g., 90°) in the fitting hole portion to change the shape of the fitting hole portion to allow fitting of the slider fitting portion into the fitting hole portion. Then, the opening/closing door is closed to close the doorway and the slider is moved (forward) to thereby fit the slider fitting portion into the fitting hole portion and cause the actuator to enter the operating portion of the door switch. As a result, the connection contact of the switch portion is switched to allow operation of the machine and mechanically lock the opening/closing door so that the door cannot be opened.

In this case, the slide key device allows withdrawal of the key only when fitting of the slider fitting portion is prevented and therefore the key cannot be detached from the lock.

In case in which the worker tries to enter the working space in order to perform maintenance of the machine, power supply to the machine is interrupted and locking is cancelled to allow opening of the opening/closing door. The worker moves the slider backward to thereby withdraw the actuator from the operating portion. In this case, because the key can be withdrawn only when the fitting of the slider fitting portion is prevented, the key can be detached from the key hole of the lock.

In this way, when the slider is moved backward to withdraw the actuator from the operating portion, it is possible to prevent movement of the slider with the slide key device to thereby prevent entry of the actuator into the operating portion. As a result, it is impossible to actuate the door switch and to bring the machine into operation and therefore it is possible to secure safety of the worker. Moreover, because it is possible to withdraw the key from the lock only when the slider is moved backward to prevent entry of the actuator into the operating portion, it is possible to prevent carrying away of the key by mistake.

Therefore, in case of the safety switch according to the invention, the closing piece which is necessary for the prior-art safety device so as to prevent movement of the actuator so that the machine does not operate even if the opening/closing door is closed accidentally when the worker is remaining in the working space and the locking mechanism (padlock) for locking the closing piece in the closing position become unnecessary. As a result, the parts are few for the safety switch and the cost can be reduced.

In the above safety switch according to the invention, the slider fitting portion is formed with an interference protrusion inserting portion along a slider moving direction, the slide lock is provided with the interference protruding portion, and the interference protruding portion is positioned in the interference protrusion inserting portion when the slider fitting portion is fitted into the fitting hole portion to prevent rotation of the slide lock to thereby make withdrawal of the key impossible.

With this structure, to close the opening/closing door and operate the machine in the working space, the key inserted into the key hole of the lock is rotated through a predetermined angle (e.g., 90°) to thereby rotate the slide lock through a predetermined angle (e.g., 90°) in the fitting hole portion to orient the interference protruding portion laterally, for example. Thus, the interference protruding portion does not interfere with the interference protrusion inserting portion of the slider fitting portion and can be fitted.

Then, the opening/closing door is closed to close the doorway and slider is moved (forward) to thereby cause the actuator to enter the operating portion of the door switch. In this case, even if someone tries to rotate the key inserted into the key hole of the lock, he/she cannot rotate the key, nor can he/she detach the key from the lock because the interference protruding portion of the slide lock is in the interference protrusion inserting portion and interferes with side wall portions of the interference protrusion inserting portion.

In the above safety switch according to the invention, the slider is movably retained on a slide base in the slider moving direction, and the slide key device has the lock provided to the slider, a lock lever as the slider movement preventing member coupled to a movable portion provided to the lock, and a lever engaging portion which is provided to the slide base and with which the lock lever is detachably engaged, and wherein the lock is configured to rotate the lock lever by a predetermined amount of rotating operation of the key inserted into a key hole of the lock to detachably engage the lock lever with or from the lever engaging portion to thereby select locking of the slider or cancellation of the locked state and to allow the key to be withdrawn only in the case of locking of the slider.

In the above safety switch according to the invention, the slide base is provided with a sliding recessed portion along the slider moving direction, the lever engaging portion is connected to a side face side of the sliding recessed portion, the slider is provided at its back face with a recessed portion, the lock lever is positioned in the recessed portion, the slider is movably inserted into the sliding recessed portion to cause the slide base to retain the slider, and the lock lever is positioned in the sliding recessed portion when the actuator enters the operating portion due to movement of the slider to prevent rotation of the lock lever to thereby make withdrawal of the key impossible.

In the above safety switch according to the invention, the slider is movably retained on a slide base in the slider moving direction, and the slide key device has the lock provided to the slide base, a lock lever as the slider movement preventing member coupled to a movable portion provided to the lock; and a lever engaging portion which is provided to the slider and with which the lock lever is detachably engaged, and wherein the lock is configured to rotate the lock lever by a predetermined amount of rotating operation of the key inserted into a key hole of the lock to detachably engage the lock lever with or from the lever engaging portion to thereby select locking of the slider or cancellation of the locked state and to allow the key to be withdrawn only in the case of locking of the slider.

In the above safety switch according to the invention, the slide base is provided with a sliding recessed portion along the slider moving direction, the slider is movably inserted into the sliding recessed portion to cause the slide base to retain the slider, the slide base is formed with a lock mounting portion, a lever housing portion is provided in the lock mounting portion, the lock is mounted to the lock mounting portion, the lock lever is housed in the lever housing portion, and the lock lever is caused to interfere with the slider to prevent rotation of the lock lever to thereby make withdrawal of the key impossible when the lock lever is detached from the lever engaging portion and the actuator enters the operating portion due to movement of the slider.

With the safety switch according to the invention, when the slider is moved backward to withdraw the actuator from the operating portion, it is possible to prevent movement of the slider with the slide key device to thereby prevent entry of the actuator into the operating portion. As a result, it is impossible to actuate the door switch and to bring the machine into operation and therefore it is possible to secure safety of the worker.

Therefore, the closing piece which is necessary for the prior-art safety device so as to prevent movement of the actuator so that the machine does not operate even if the opening/closing door is closed accidentally when the worker is remaining in the working space and the locking mechanism (padlock) for locking the closing piece in the closing position become unnecessary. As a result, the parts are few for the safety switch and the cost can be reduced.

DETAILED DESCRIPTION OF THE PREFERRED EMBODIMENTS

Embodiments of the present invention will be described.

Embodiment 1

Embodiment 1 of the invention will be described below based on FIGS. 1 to 11.

Figure 1:
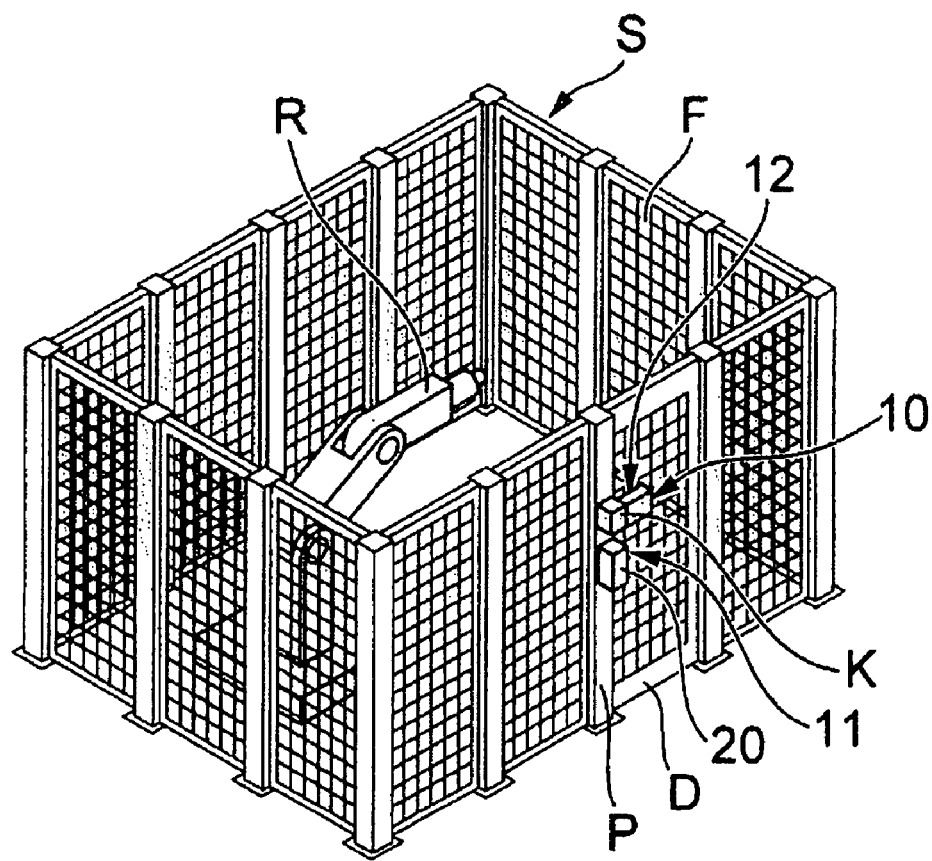
FIG. 1 shows a perspective view of a working space and a safety switch according to the present invention.

In FIG. 1, a reference numeral S designates a working space. The working space S is a space where a working robot R as a machine is fenced near its driving range with a fence F to secure safety around the space. A hinged opening/closing door D is provided to a doorway of the fence F. In FIG. 1, a reference numeral 10 designates a safety switch of the invention.

Figure 2:
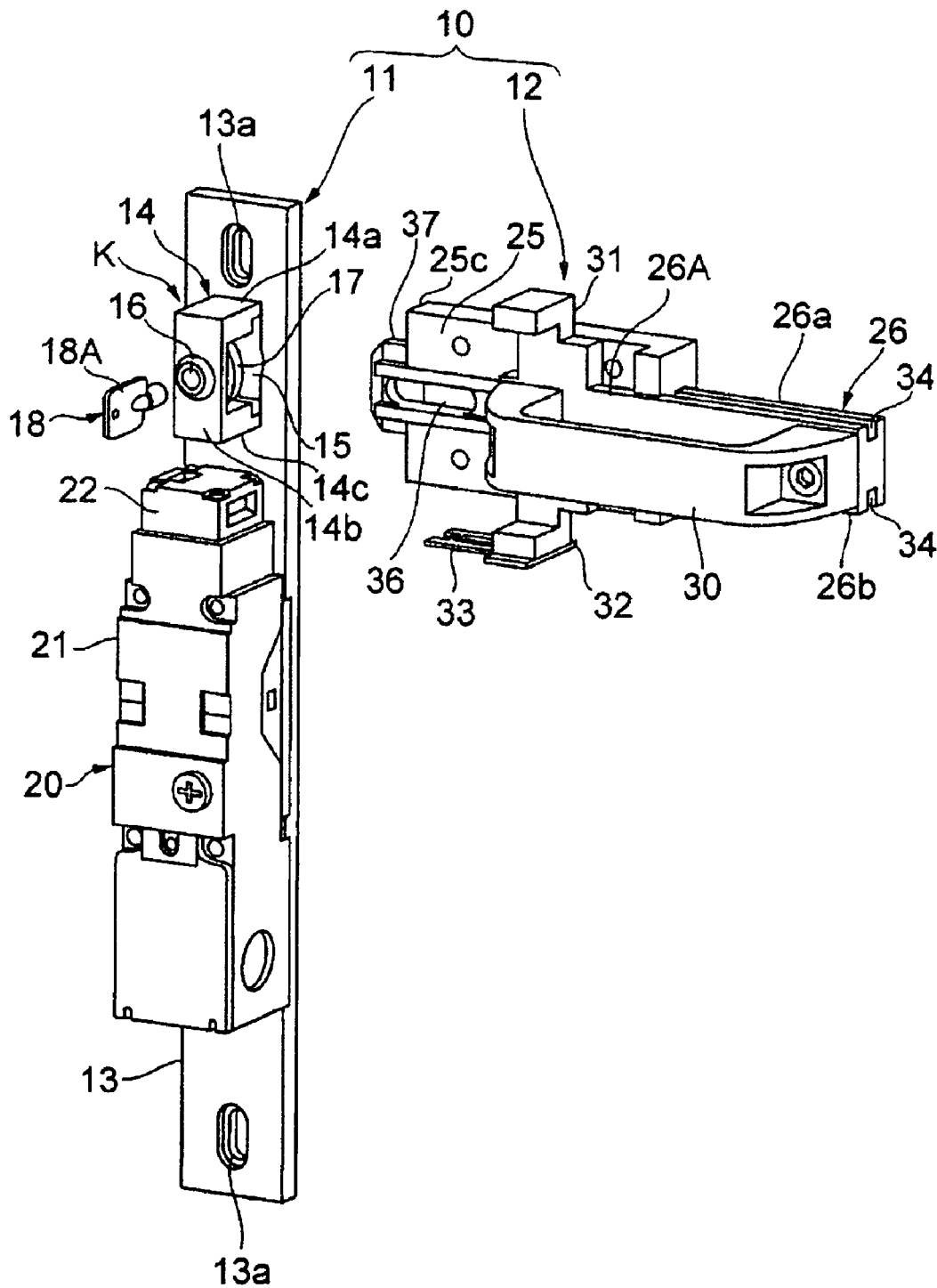
FIG. 2 shows a perspective view of embodiment 1 of the safety switch according to the invention.

The safety switch 10 has a door switch unit 11 provided to a post P forming an edge portion of the doorway and a slider unit 12 provided to the opening/closing door D as shown in FIG. 2 and the door switch unit 11 and the slider unit 12 are disposed so as to face each other when the opening/closing door D is closed.

Figure 5:
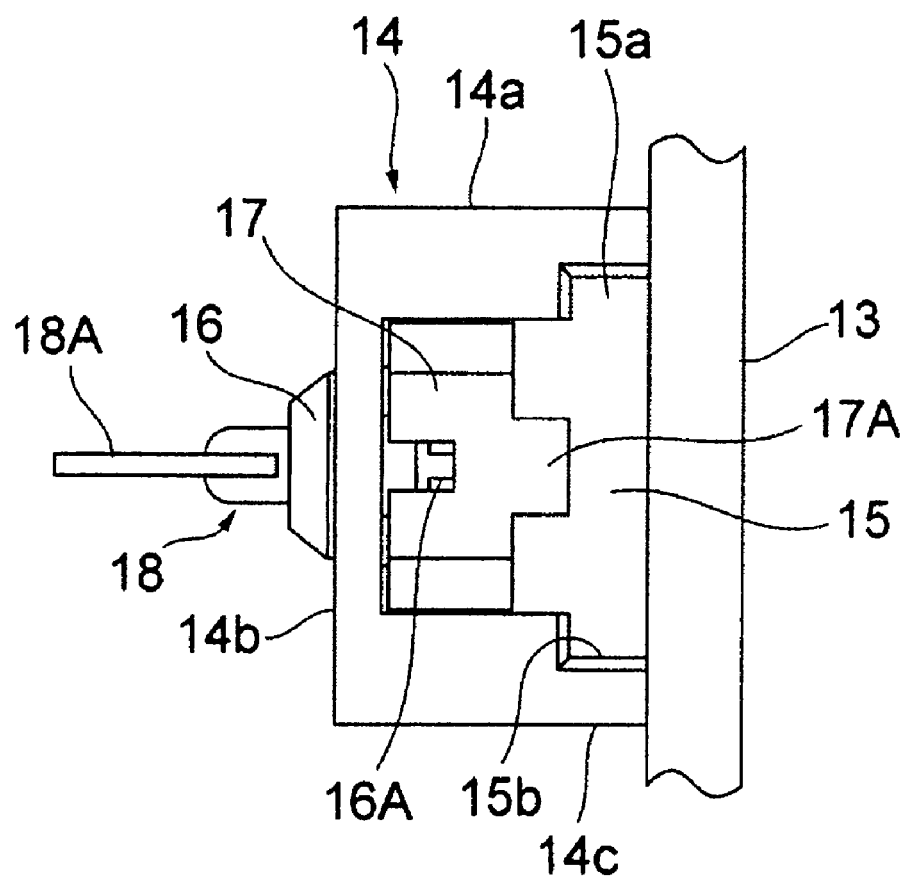
FIG. 5 shows a view taken along a direction of an arrow X in FIG. 3.

The door switch unit 11 has a strip-shaped base 13 and the base 13 is formed at its upper and lower end portions with mounting holes 13a. At an upper portion of the base 13, a slide key mechanism K that is a slide key means is provided. The slide key mechanism K has a guide 14 formed on the base 13. The guide 14 has an angular U shape having an upper face portion 14a, a side face portion 14b, and a lower face portion 14c as shown in FIG. 5. The guide 14 and the base 13 form a fitting hole portion 15 extending in a horizontal direction that is a slider moving direction. The fitting hole portion 15 has an upper guide groove portion 15a formed in an inner face of the upper face portion 14a and a lower guide groove portion 15b formed in an inner face of the lower face portion 14c.

Figure 8:
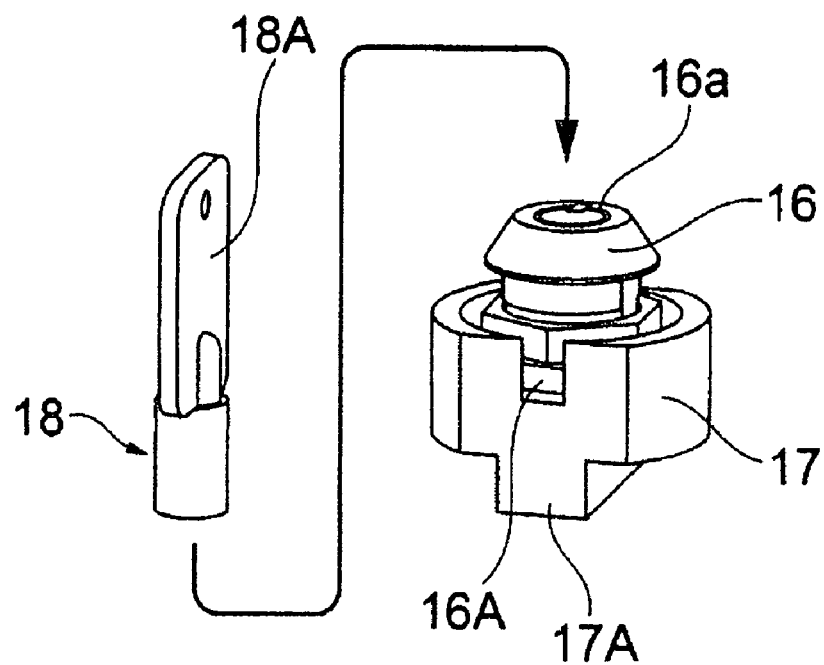
FIG. 8 shows a perspective view of a state in which a lock and a key are separated from each other.

A lock 16 is fixed to the side face portion 14b of the guide 14. The lock 16 retains a slide lock 17 that is a slider movement preventing member at its movable portion 16A so that the slide lock 17 can rotate and the slide lock 17 has at its lower end portion an interference protruding portion 17A as shown in FIGS. 5 and 8. In the lock 16, it is possible to rotate the slide lock 17 through 90° in the fitting hole portion 15 by rotating a key 18 inserted into a key hole 16a of the lock 16 through 90°. As a result of this rotation of the slide lock 17, a shape of the fitting hole portion 15 changes into such a shape as to prevent fitting of a slider fitting portion 37 which will be described later and such a shape as to allow the fitting.

Figure 3:
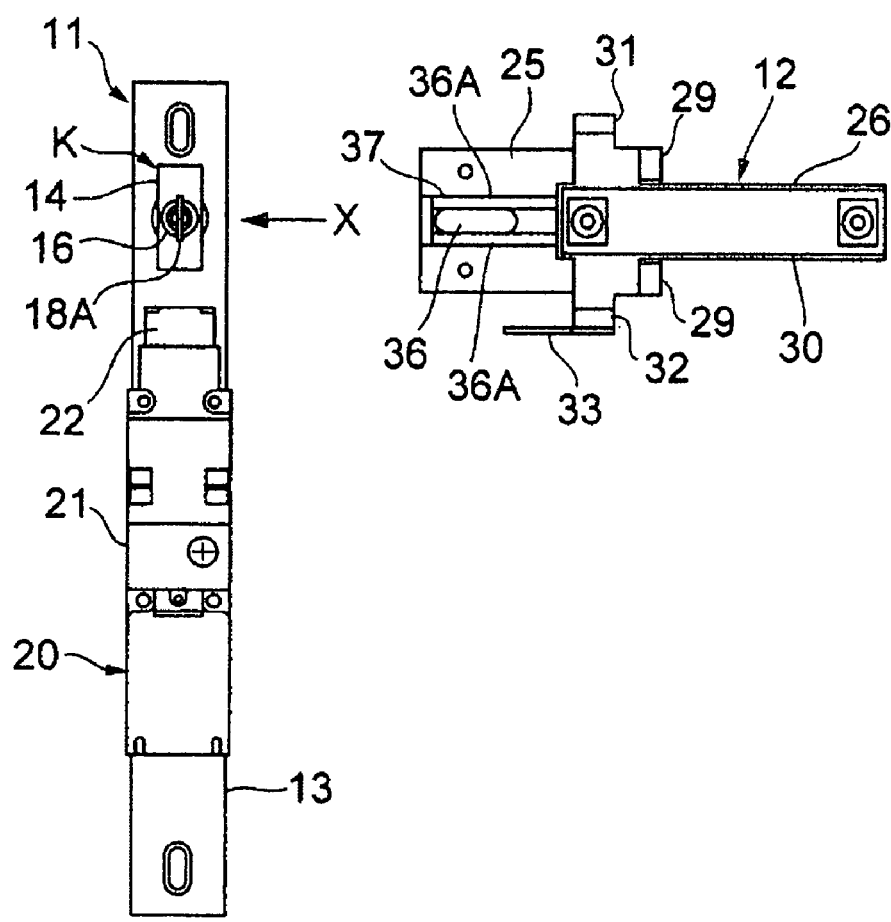
FIG. 3 shows a front view of a state in which a slider is moved backward and an actuator is withdrawn from an operating portion to prevent actuation of a door switch in the safety switch.
Figure 4:
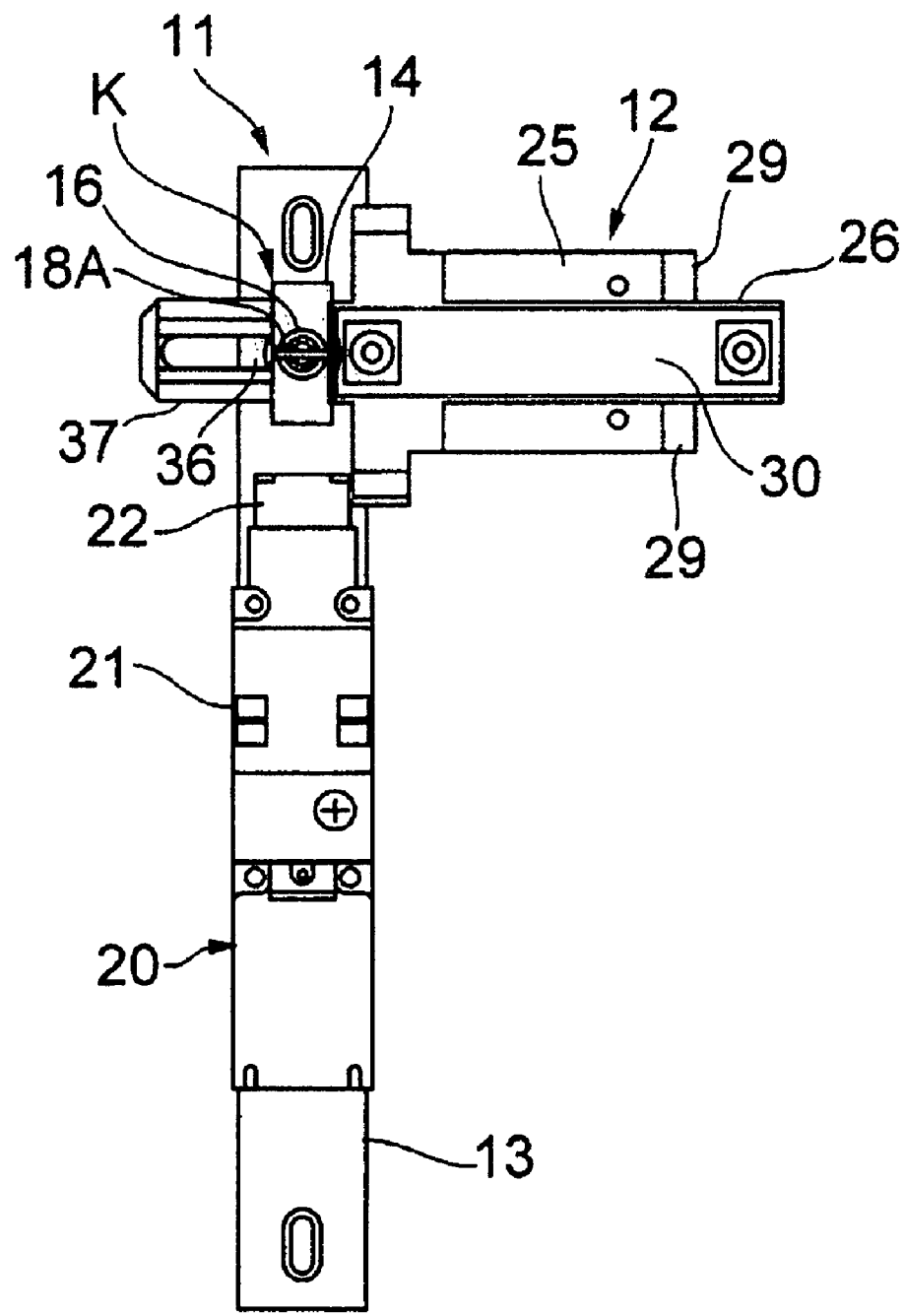
FIG. 4 shows a front view of a state in which the slider is moved forward and the actuator is caused to enter the operating portion to actuate the door switch in the safety switch.
Figure 9:
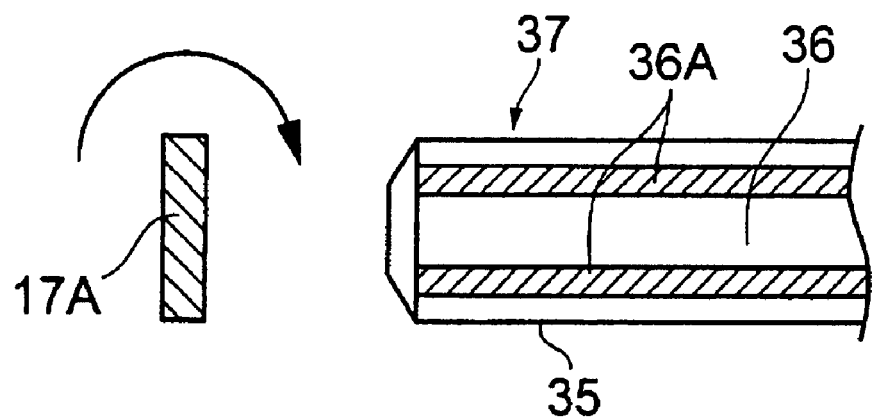
FIG. 9 shows an explanatory view for explaining a state in which fitting of a slider fitting portion into a fitting hole portion by a slide lock of the lock is prevented.
Figure 10:
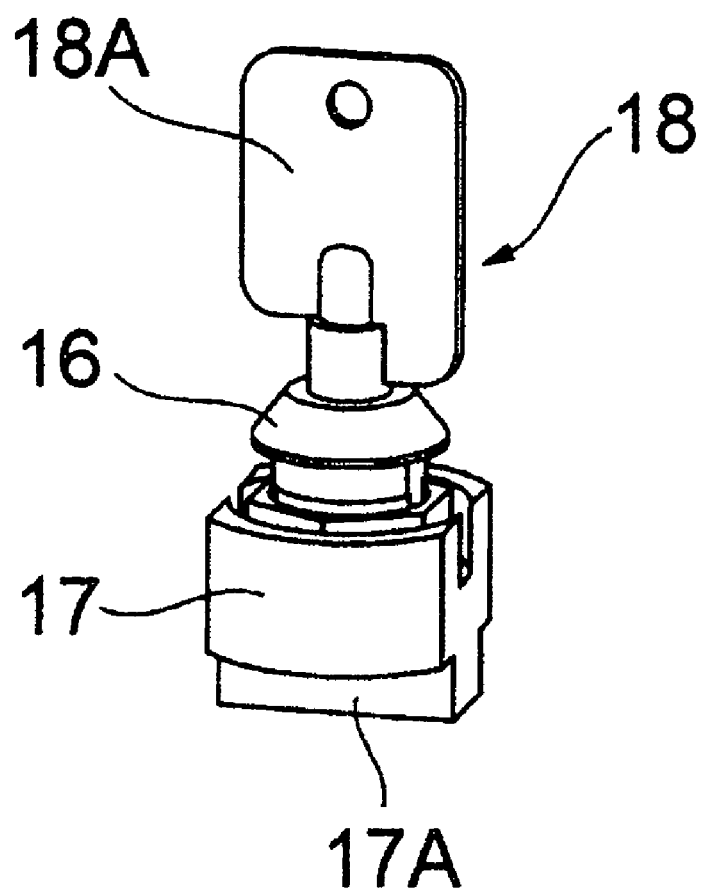
FIG. 10 shows a perspective view of a state in which the key is inserted into a key hole of the lock.
Figure 11:
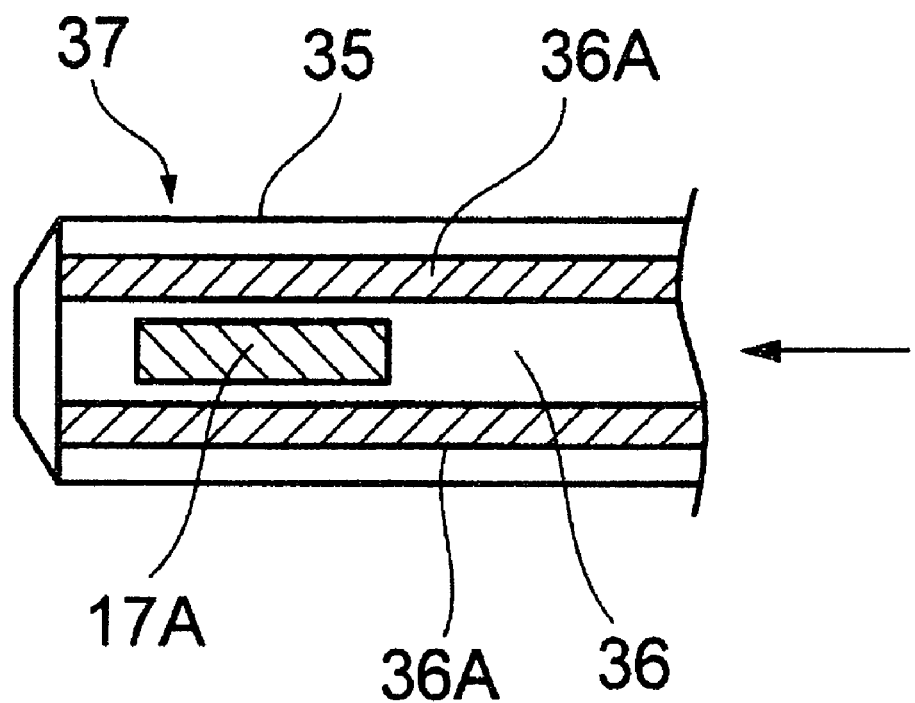
FIG. 11 shows an explanatory view for explaining a state in which prevention of fitting of the slider fitting portion into the fitting hole portion is cancelled by rotation of the slide lock of the lock.

In this case, as shown in FIG. 3, in a state in which a plate-shaped operating portion 18A of the key 18 is positioned in a vertical orientation, the interference protruding portion 17A is in a vertical orientation to prevent fitting of the slider fitting portion 37 into the fitting hole portion 15 as shown in FIG. 9. As shown in FIGS. 4 and 10, if the key 18 is rotated through 90° so that the operating portion 18A of the key 18 is oriented laterally to rotate the slide lock 17 through 90°, the interference protruding portion 17A is oriented laterally and the fitting hole portion 15 is brought into a state for allowing the fitting as shown in FIG. 5 and the slider fitting portion 37 can be fitted into the fitting hole portion 15 as shown in FIG. 11.

As described above, in the state in which the interference protruding portion 17A of the slide lock 17 is in the vertical orientation to prevent fitting of the slider fitting portion 37 into the fitting hole portion 15, the key 18 can be withdrawn from the key hole 16a of the lock 16. However, in a state in which the slider fitting portion 37 is fitted in the fitting hole portion 15, as shown in FIG. 11, the interference protruding portion 17A is positioned between ridge portions 36A of a pair of the slider fitting portion 37 and therefore the slide lock 17 cannot be rotated and it is impossible to withdraw the key 18 from the key hole 16a of the lock 16.

Moreover, as shown in FIG. 2, a door switch 20 is fixed to the base 13. The door switch 20 is structured so that a connection contact is switched when an actuator 33 which will be described later enters an operating portion 22 and an operating rod of the switch portion (both of them are not shown) moves in response to this entry. The door switch 20 has a lock mechanism (not shown) for automatically and mechanically prevent withdrawal of the actuator 33 that has entered the operating portion 22.

In other words, the switch 20 is structured so that the actuator 33 enters the operating portion 22 to thereby switch a movable contact of a contact block (not shown). By this switching operation, circuit connection is switched to a main circuit side (power supply circuit for an industrial machine) to allow operation of the working robot R and the lock mechanism automatically locks the actuator 33, i.e., mechanically locks the opening/closing door D so that the door D cannot be opened. On the other hand, if the switch is operated so as to interrupt power supply to the robot R, in response to an actuation off signal, a solenoid (not shown) is excited to cancel locking by the lock mechanism to thereby allow opening of the opening/closing door D.

The door switch unit 11 is fixed to the post P corresponding to the edge portion of the doorway through securing members (not shown) by using the mounting holes 13a formed in the base 13.

Figure 6:
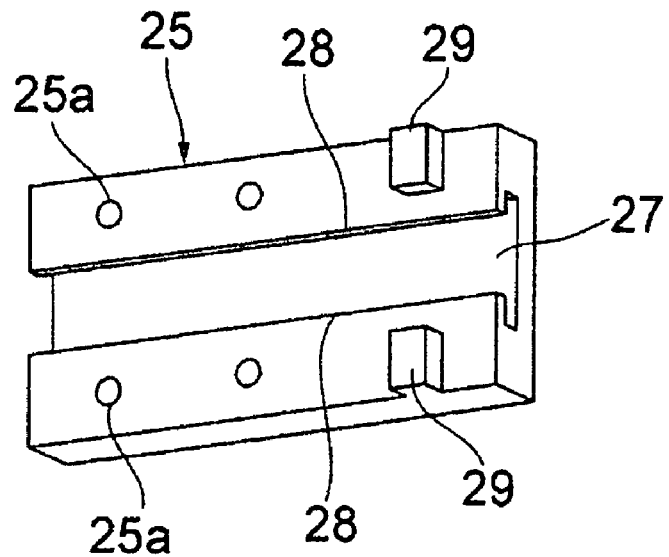
FIG. 6 shows a perspective view of a slide base.

The slider unit 12 has a slide base 25 and a slider 26 for sliding on the slide base 25 as shown in FIG. 2. The slide base 25 is formed at its surface central portion with a sliding recessed portion 27, upper and lower side portions of the sliding recessed portion 27 are formed with engaging portions 28, and the sliding recessed portion 27 is in a shape of a dovetail groove as shown in FIG. 6. Stoppers 29 are provided to the surface of the slide base 25 and mounting holes 25a are formed in the slide base 25. On a back face of the slider main body 26A, a stopper (not shown) for determining a forward movement position (a position to which the slider 26 moves toward the door switch unit 11) of the slider 26 is provided.

Figure 7:
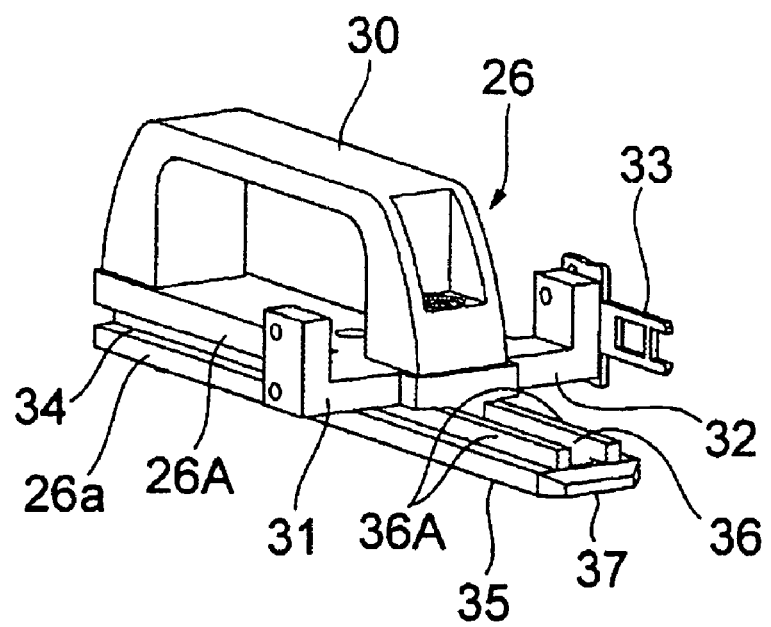
FIG. 7 shows a perspective view of a slider.

The slider 26 has the slider main body 26A, the slider main body 26A is provided with a handle 30, upper and lower arms 31, 32 are formed at a tip portion of the handle 30 to protrude to be orthogonal to a slider moving direction, and the actuator 33 is secured to a tip portion of the lower arm 32 as shown in FIGS. 2 and 7. Upper and lower face portions 26a, 26b of the slider main body 26A are formed with slide groove portions 34. A strip-shaped protruding portion 35 is formed on a tip side of the slider 26 and ridge portions 36A of a pair are provided parallel on a surface of the protruding portion 35 to form a slider fitting portion 37. In this case, a space between the ridge portions 36A of the pair functions as an interference protrusion inserting portion 36.

The slider 26 is slidably inserted into the sliding recessed portion 27 of the slide base 25. In this case, the upper and lower engaging portions 28 of the sliding recessed portion 27 are slidably engaged with the slide groove portions 34 and the slider 26 collides with the stoppers 29 in a position to which the slider 26 has moved backward. By operating the handle 30 to move the slider 26 (forward) toward the door switch unit 11, it is possible to protrude the slider fitting portion 37 from a tip end portion 25c of the slide base 25 toward the door switch unit 11. In this case, the stoppers 29 collide with a rear end portion of the slide base 25.

The slider unit 12 is mounted to the opening/closing door D by securing the slide base 25 to the opening/closing door D by using the mounting holes 25a.

Next, operation of the safety switch 10 will be described.

In the working space S, to close the opening/closing door D and to cause the working robot R to operate, the key 18 inserted into the key hole 16a of the lock 16 is rotated through 90° to thereby rotate the slide lock 17 through 90° in the fitting hole portion 15 to orient the interference protruding portion 17A laterally. Thus, as shown in FIG. 11, the interference protruding portion 17A does not interfere with the pair of ridge portions 36A of the slider fitting portion 37 and fitting of the interference protruding portion 17A becomes possible.

Then, the opening/closing door D is closed to close the doorway and the handle 30 is operated to move the slider 26 (forward) toward the door switch unit 11 to thereby fit the slider fitting portion 37 in the fitting hole portion 15 and cause the actuator 33 to enter the operating portion 22 of the door switch 20.

In this way, the movable contact of the contact block of the door switch 20 is switched and the circuit connection is switched to the main circuit side (power supply circuit for the industrial machine) to allow operation of the working robot R and the lock mechanism automatically locks the actuator 33, i.e., mechanically locks the opening/closing door D so that the door cannot to be opened.

In this case, even if someone tries to rotate the key 18 inserted into the key hole 16a of the lock 16, he/she cannot rotate the key 18, nor can he/she detach the key 18 from the lock 16 because the interference protruding portion 17A of the slide lock 17 is between the ridge portions 36A of the pair of the slider fitting portion 37 and interferes with the ridge portions 36A.

In case in which a worker tries to enter the working space S in order to perform maintenance of the working robot R, the power supply to the working robot R is interrupted. In response to the actuation off signal, the solenoid is excited to cancel locking by the lock mechanism to thereby allow opening of the opening/closing door D. Then, the worker pulls the handle 30 of the slider 26 and moves the slider 26 backward as shown in FIG. 3 to thereby withdraw the slider fitting portion 37 from the fitting hole portion 15 and withdraw the actuator 33 from the operating portion 22 of the door switch 20.

In this case, the key 18 inserted into the key hole 16a of the lock 16 is rotated reversely through 90° to orient the interference protruding portion 17A vertically to prevent fitting of the slider fitting portion 37 into the fitting hole portion 15 as shown in FIG. 9. In this state, the key 18 is detached from the key hole 16a of the lock 16. Then, the worker turns the opening/closing door D to open the doorway and enters the working space S.

In this way, when the slider 26 is moved backward to withdraw the slider fitting portion 37 from the fitting hole portion 15, the key 18 is rotated reversely through 90° and detached from the key hole 16a of the lock 16 and, as a result, it becomes impossible to actuate the door switch 20 and to bring the working robot R into operation to thereby secure safety of the worker. Moreover, because it is possible to detach the key 18 from the key hole 16a of the lock 16 only when the slider 26 is moved backward to withdraw the slider fitting portion 37 from the fitting hole portion 15, it is possible to prevent carrying away of the key 18 by mistake.

Therefore, the closing piece which is necessary for the prior-art safety switch so as to prevent movement of the actuator 33 so that the working robot R does not operate even if the opening/closing door D is closed accidentally when the worker is remaining in the working space S and the locking mechanism (padlock) for locking the closing piece in the closing position become unnecessary. As a result, the parts are few for the safety switch and the cost can be reduced.

Embodiment 2

Embodiment 2 of the invention will be described below based on FIGS. 12 to 19.

Although the slide key mechanism K is positioned on the door switch unit 11 side in above-described embodiment 1 of the invention, a slide key mechanism K-1 that is a slide key means is provided to the slider unit 12 in embodiment 2 of the invention. Therefore, the guide 14 and the fitting hole portion 15 formed by the guide 14 of above-described embodiment 1 of the invention do not exist in the door switch unit 11. The slider 26 does not have the slider fitting portion 37 of above-described embodiment 1 of the invention and only the protruding portion 35 exists on the tip side of the slider main body 26A. In embodiment 2 of the invention, parts and portions similar to those of above-described embodiment 1 of the invention will be provided with similar reference numerals to omit description of them in embodiment 2 of the invention.

Figure 12:
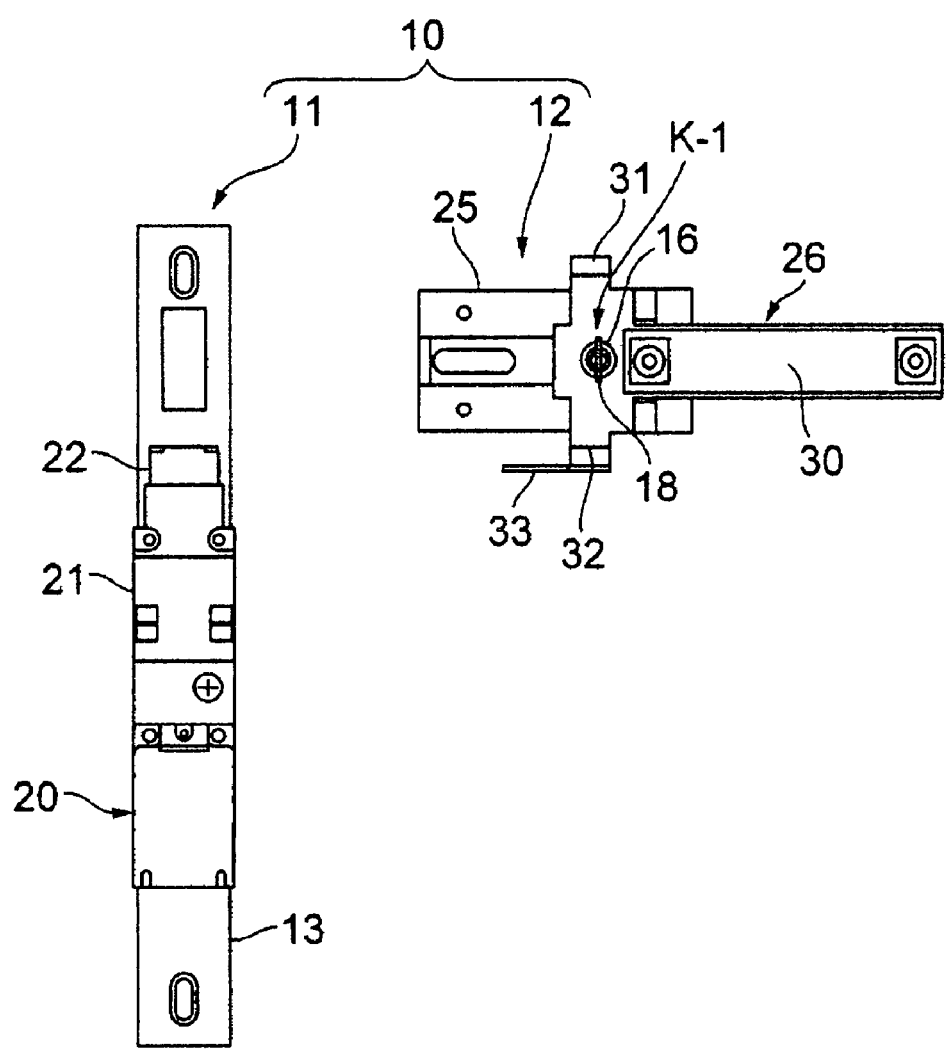
FIG. 12 shows a front view of a state in which a slider is moved backward and an actuator is withdrawn from an operating portion to prevent actuation of a door switch in embodiment 2 of the safety switch according to the invention.
Figure 13:
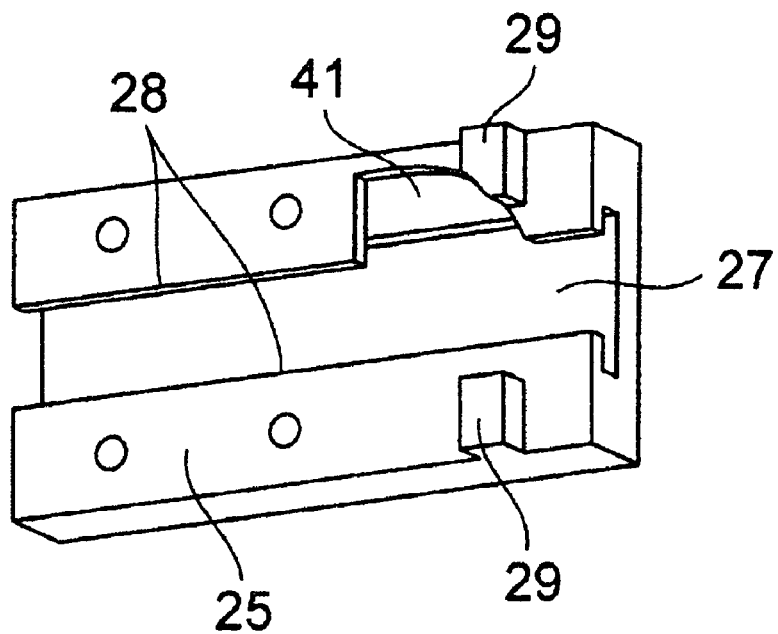
FIG. 13 shows a perspective view of a slide base.

The slide key mechanism K-1 includes a lock 16 (see FIG. 12) provided to the slider main body 26A of the slider 26, a lock lever 40 (see FIG. 15) that is a slider movement preventing member coupled to a tip end portion of a movable portion 16A provided to the lock 16, and a lever engaging portion 41 (see FIG. 13) of the slide base 25, the lock lever 40 being detachably engaged with the lever engaging portion 41. The lever engaging portion 41 is connected to the sliding recessed portion 27 as shown in FIG. 13.

Figure 14:
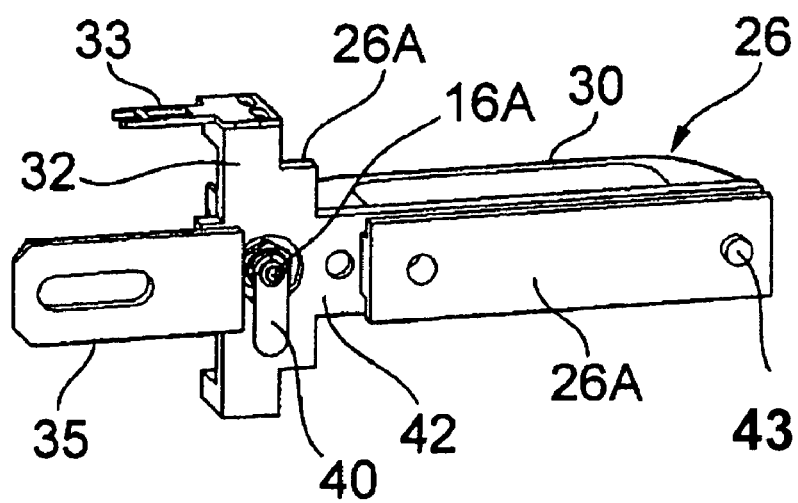
FIG. 14 shows a perspective view of a state in which a lock lever is positioned in a vertical orientation in the slider when seen from behind.
Figure 15:
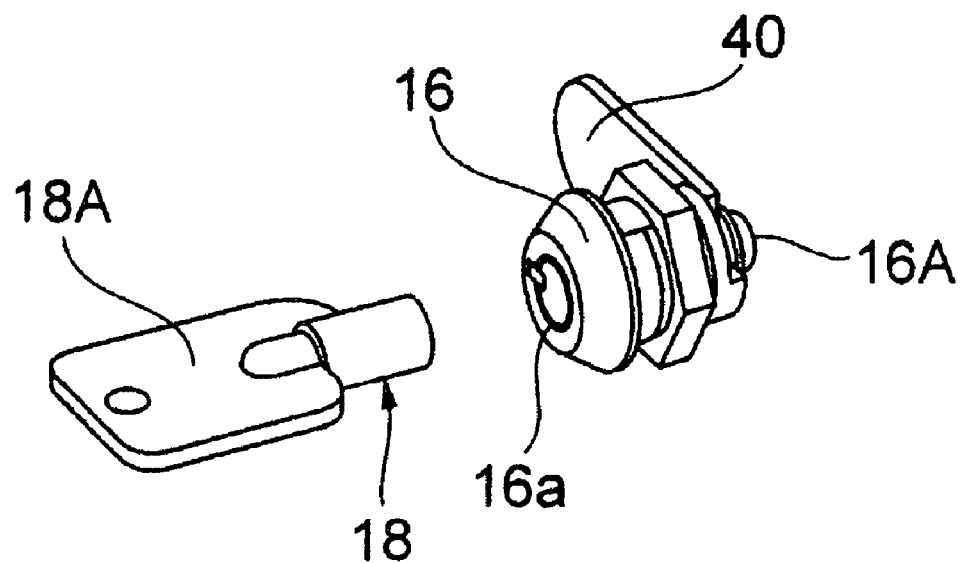
FIG. 15 shows a perspective view in which a lock and a key are separated from each other.

In other words, as shown in FIG. 14, a recessed portion 42 is formed in a back face of the slider main body 26A, the lock 16 is mounted to a front face side of the slider main body 26A, and the lock lever 40 is in the recessed portion 42. By rotating the key 18 inserted into the key hole 16a of the lock 16 through 90°, the lock lever 40 is turned and a tip portion of the lock lever 40 is engaged with the lever engaging portion 41 to lock the slider 26. By reversely rotating the key 18 through 90°, the tip portion of the lock lever 40 can be detached from the lever engaging portion 41 to thereby cancel locking of the slider 26. On the back face of the slider main body 26A, a stopper 43 for determining a forward movement position of the slider 26 is provided.

Figure 16:
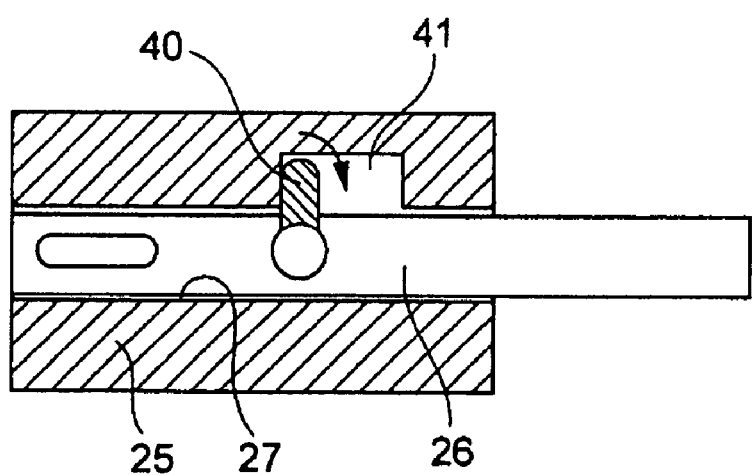
FIG. 16 shows an explanatory view for explaining a state of locking of the slider.
Figure 17:
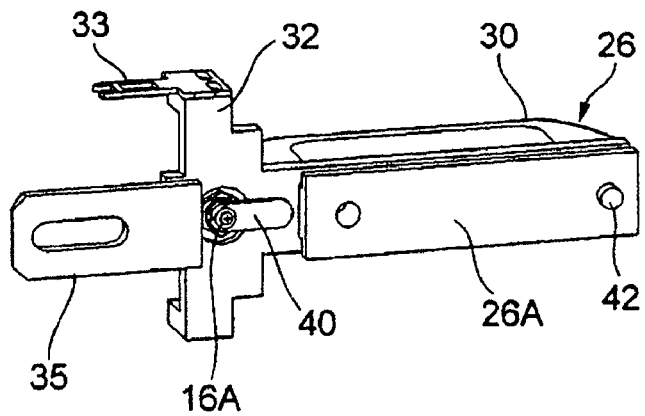
FIG. 17 shows a perspective view in which the lock lever is positioned in a lateral orientation in the slider when seen from behind.
Figure 18:
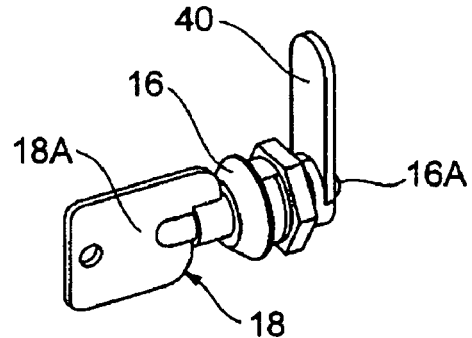
FIG. 18 shows a perspective view of a state in which the key is inserted into a key hole of the lock.
Figure 19:
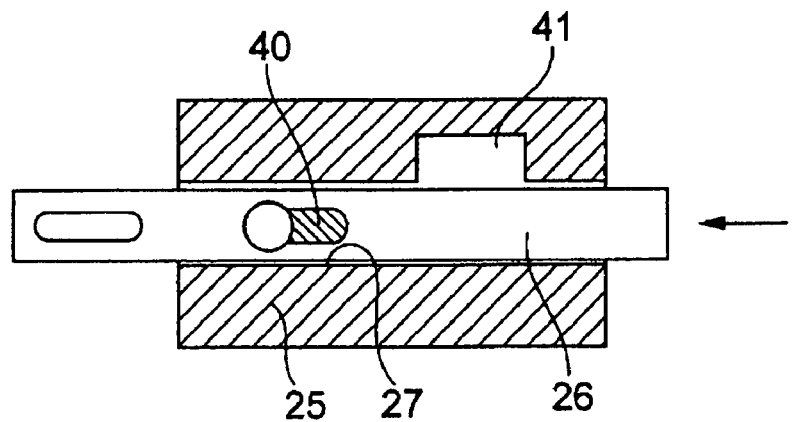
FIG. 19 shows an explanatory view for explaining a released state of the slide lock.

Therefore, in the working space S, to close the opening/closing door D and operate the working robot R, the key 18 is inserted into the key hole 16a of the lock 16 and the key 18 is turned through 90° to thereby turn the lock lever 40 in a direction of an arrow in FIG. 16 to detach the tip portion of the lock lever 40 from the lever engaging portion 41 to cancel locking of the slider 26.

Then, the opening/closing door D is closed to close the doorway and the handle 30 is operated to move the slider 26 (forward) toward the door switch unit 11 to thereby cause the actuator 33 to enter the operating portion 22 of the door switch 20. In this case, the stopper 43 collides with the rear end portion of the slide base 25.

As a result, the movable contact of the contact block of the door switch 20 is switched, circuit connection is switched to the main circuit side (power supply circuit for the industrial machine) to allow operation of the working robot R, and the lock mechanism automatically locks the actuator 33, i.e., mechanically locks the opening/closing door D so that the door D cannot be opened.

In this case, even if someone tries to rotate the key 18 inserted into the key hole 16a of the lock 16, he/she cannot rotate the key 18, nor can he/she detach the key 18 from the lock 16 because the lock lever 40 is in the sliding recessed portion 27.

In case in which a worker tries to enter the working space S in order to perform maintenance of the working robot R, the power supply to the working robot R is interrupted. In response to the actuation off signal, the solenoid is excited to cancel locking by the lock mechanism to thereby allow opening of the opening/closing door D. Then, the worker pulls the handle 30 of the slider 26 and moves the slider 26 backward as shown in FIG. 12 to thereby withdraw the actuator 33 from the operating portion 22 of the door switch 20.

In this case, the key 18 inserted into the key hole 16a of the lock 16 is rotated reversely through 90° to turn the lock lever 40 into a vertical orientation to engage it with the lever engaging portion 41 to lock the slider 26 as shown in FIG. 16. In this state, the key 18 is withdrawn from the key hole 16a of the lock 16. Then, the worker turns the opening/closing door D to open the doorway and enters the working space S.

Embodiment 3

Embodiment 3 of the invention will be described below based on FIGS. 20 to 27.

Although the slide key mechanism K is positioned on the door switch unit 11 side in above-described embodiment 1 of the invention, a slide key mechanism K-2 that is a slide key means is provided to the slider unit 12 in embodiment 3 of the invention. Therefore, the guide 14 and the fitting hole portion 15 formed by the guide 14 of above-described embodiment 1 of the invention do not exist in the door switch unit 11. The slider 26 does not have the slider fitting portion 37 of above-described embodiment 1 of the invention and only the protruding portion 35 exists on the tip side of the slider main body 26A. In embodiment 3 of the invention, parts and portions similar to those of above-described embodiment 1 of the invention will be provided with similar reference numerals to omit description of them in embodiment 3 of the invention.

Figure 20:
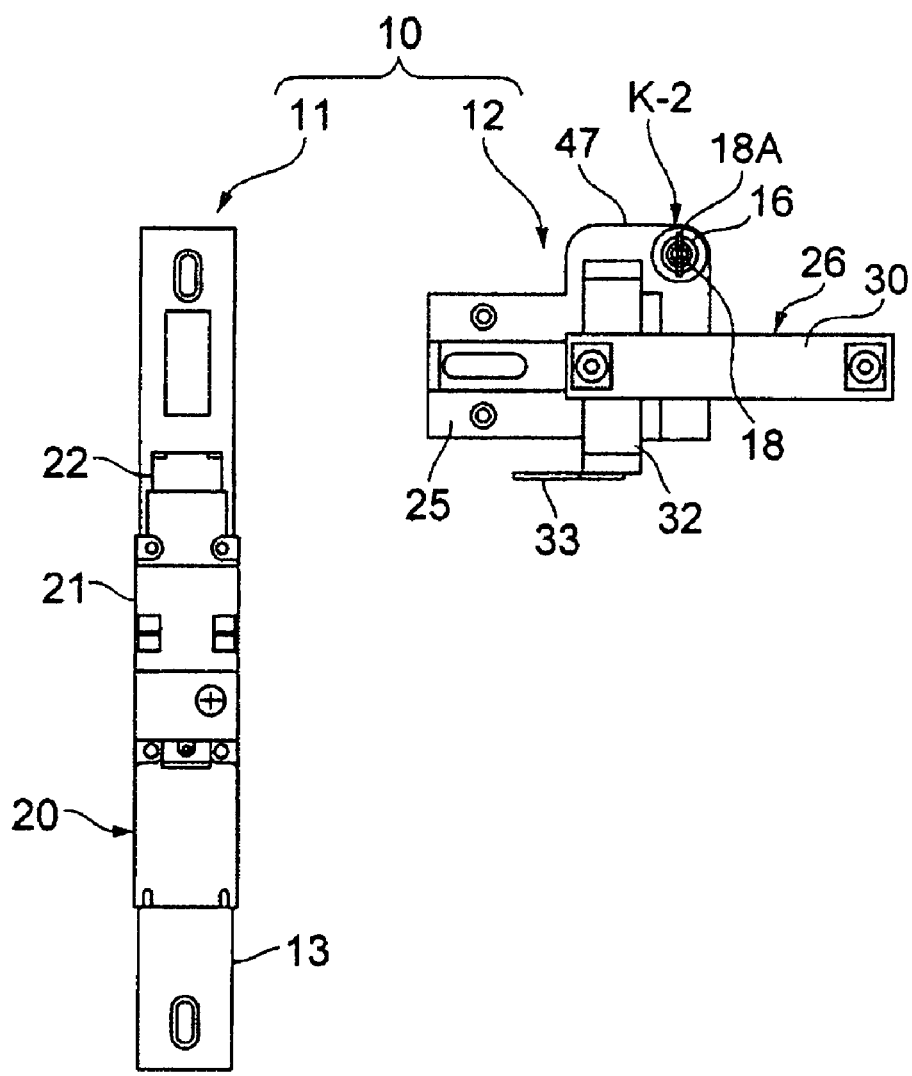
FIG. 20 shows a front view of a state in which a slider is moved backward and an actuator is withdrawn from an operating portion to prevent actuation of a door switch in embodiment 3 of the safety switch according to the invention.
Figure 21:
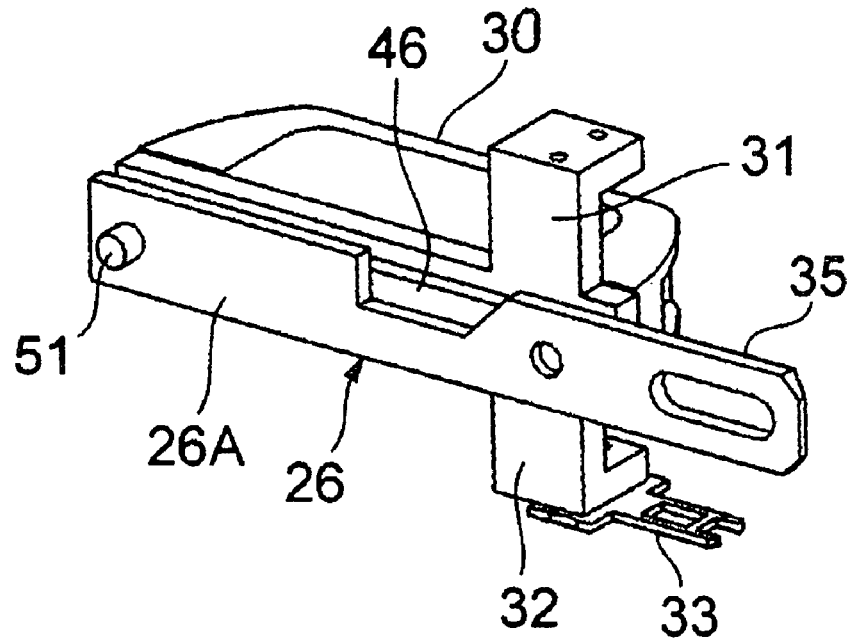
FIG. 21 shows a perspective view of a slider seen from behind.

The slide key mechanism K-2 includes a lock 16 (see FIG. 20) provided to the slide base 25 of the slider unit 12, a lock lever 50 (see FIG. 23) that is a slider movement preventing member coupled to a tip end portion of a movable portion 16A of the lock 16, and a lever engaging portion 46 (see FIG. 21) of the slider 26, the lock lever 50 being detachably engaged with the lever engaging portion 46. The lever engaging portion 46 is formed on a back face of the slider main body 26A as shown in FIG. 21. On the back face of the slider main body 26A, a stopper 51 for determining a forward movement position of the slider 26 is also provided.

Figure 22:
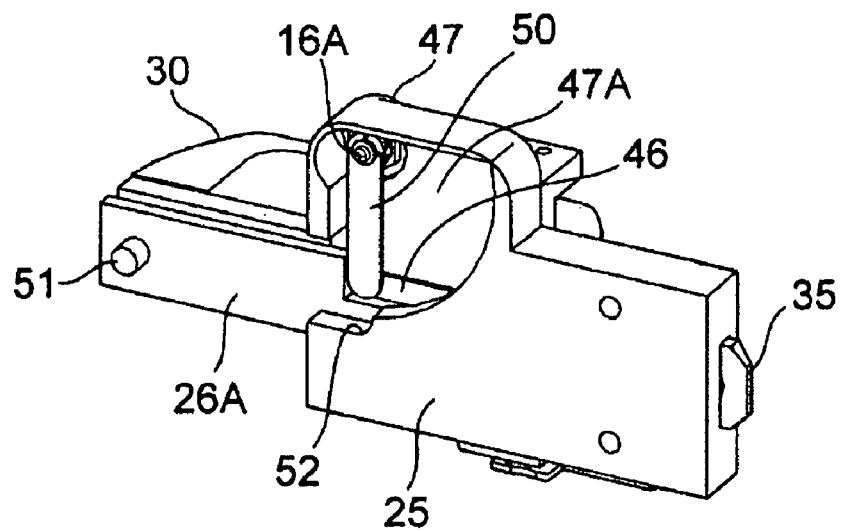
FIG. 22 shows a perspective view of a slider unit seen from behind.
Figure 23:
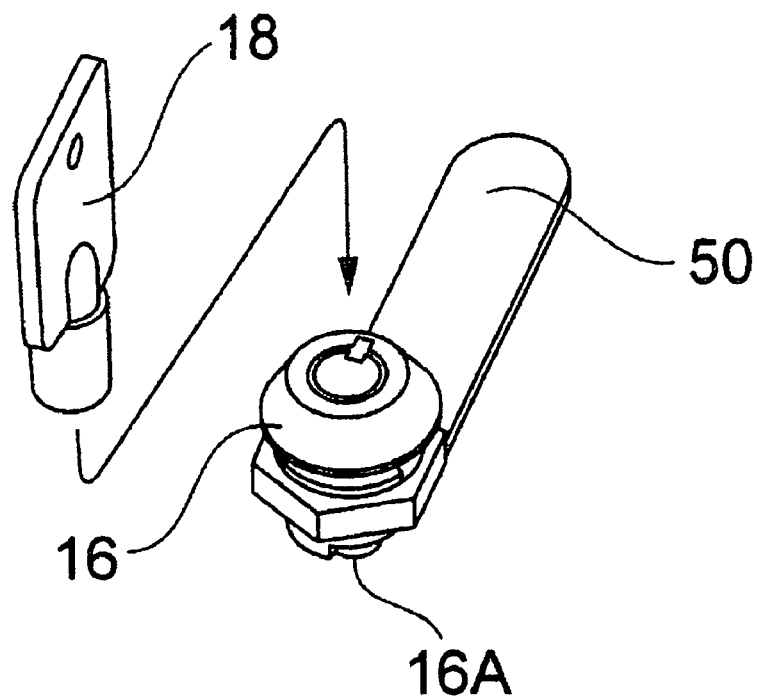
FIG. 23 shows a perspective view of a state in which a lock and a key are separated from each other.

In other words, as shown in FIG. 22, the slide base 25 is formed with a lock mounting portion 47 and space in the lock mounting portion 47 functions as a lever housing portion 47A. The lock 16 is mounted to a front side of the lock mounting portion 47, and the lock lever 50 is in the lever housing portion 47A. By rotating the key 18 inserted into the key hole 16a of the lock 16 through 90°, the lock lever 50 is rotated through 90° and a tip portion of the lock lever 50 is protruded outside the lever housing portion 47A and engaged with the lever engaging portion 46 to lock the slider 26. By reversely rotating the key 18 through 90°, the tip portion of the lock lever 50 can be detached from the lever engaging portion 46 to thereby cancel locking of the slider 26. At a rear end portion of the slide base 25, a stopper receiving portion 52 is formed.

Figure 24:
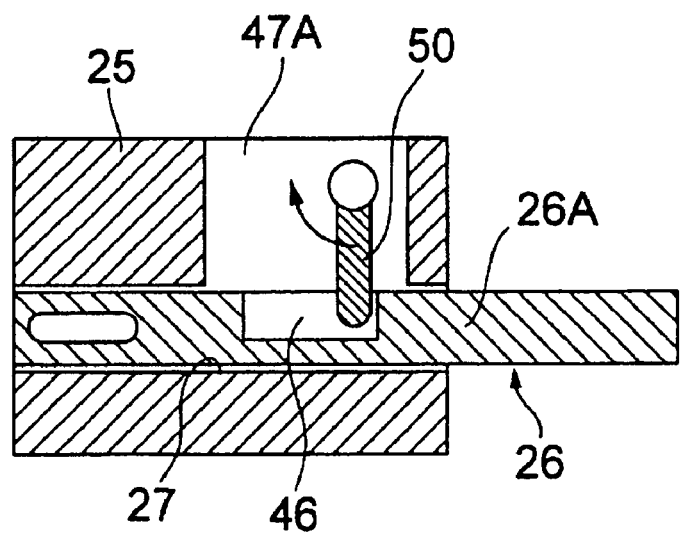
FIG. 24 shows an explanatory view for explaining a locked state of the slider.
Figure 25:
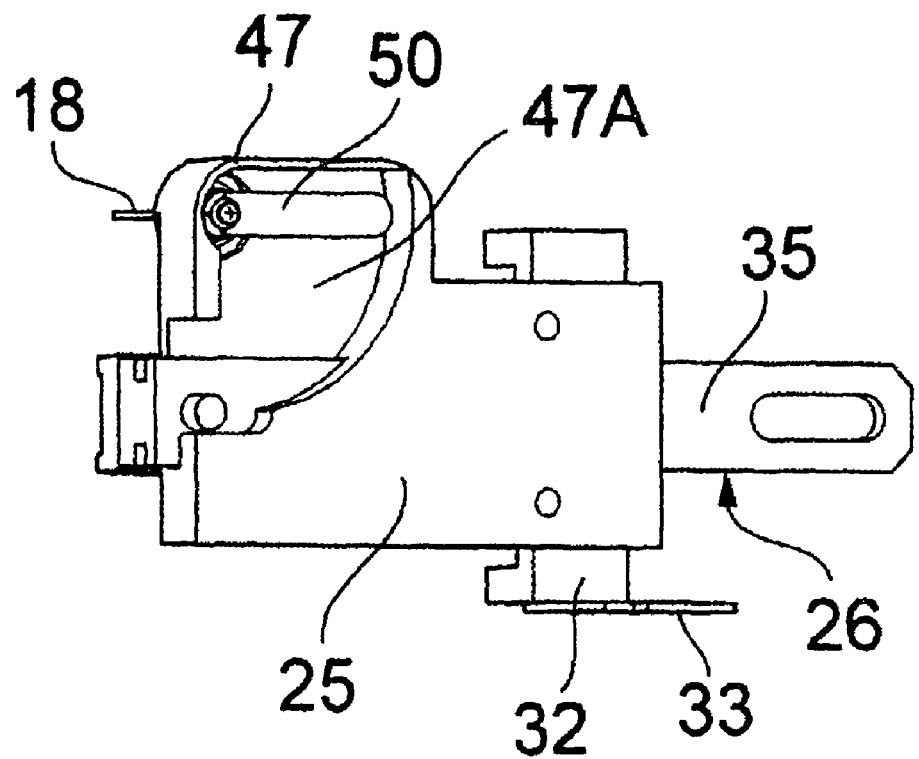
FIG. 25 shows a perspective view of a state in which a lock lever is positioned in a lateral orientation in a slider unit when seen from behind.
Figure 26:
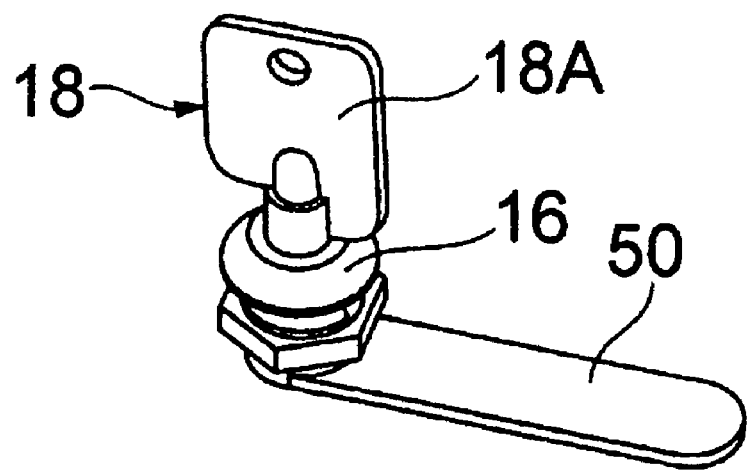
FIG. 26 shows a perspective view in which the key is inserted into a key hole of the lock.

Therefore, in the working space S, to close the opening/closing door D and operate the working robot R, the key 18 is inserted into the key hole 16a of the lock 16 and the key 18 is rotated through 90° to thereby turn the lock lever 50 in a direction of an arrow in FIG. 24 to detach the tip portion of the lock lever 50 from the lever engaging portion 46 to cancel locking of the slider 26.

Then, the opening/closing door D is closed to close the doorway and the handle 30 is operated to move the slider 26 (forward) toward the door switch unit 11 to thereby cause the actuator 33 to enter the operating portion 22 of the door switch 20. In this case, the stopper 51 collides with the stopper receiving portion 52 at the rear end portion of the slide base 25.

As a result, the movable contact of the contact block of the door switch 20 is switched, circuit connection is switched to the main circuit side (power supply circuit for the industrial machine) to allow operation of the working robot R, and the lock mechanism automatically locks the actuator 33, i.e., mechanically locks the opening/closing door D so that the door D cannot be opened.

Figure 27:
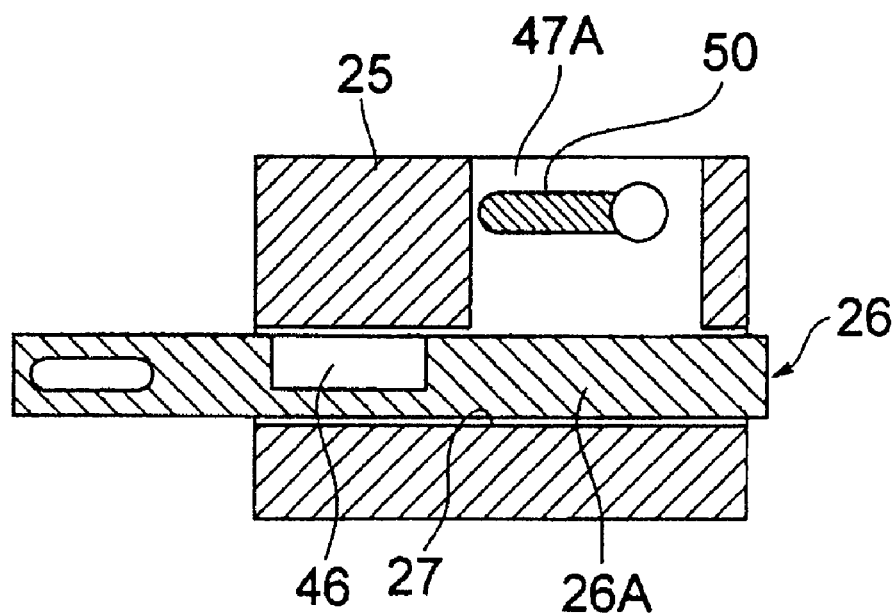
FIG. 27 is an explanatory view for explaining a released state of the slide lock.

In this case, even if someone tries to rotate the key 18 inserted into the key hole 16a of the lock 16, he/she cannot rotate the key 18, nor can he/she detach the key 18 from the lock 16 because the lock lever 50 is in the lever housing portion 47A of the slide base 25 and the lock lever 50 interferes with the slider 26 as shown in FIG. 27.

In case in which a worker tries to enter the working space S in order to perform maintenance of the working robot R, the power supply to the working robot R is interrupted. In response to the actuation off signal, the solenoid is excited to cancel locking by the lock mechanism to thereby allow opening of the opening/closing door D. Then, the worker pulls the handle 30 of the slider 26 and moves the slider 26 backward as shown in FIG. 20 to thereby withdraw the actuator 33 from the operating portion 22 of the door switch 20.

In this case, the key 18 inserted into the key hole 16a of the lock 16 is rotated reversely through 90° to turn the lock lever 50 into a vertical orientation to engage it with the lever engaging portion 46 to lock the slider 26 as shown in FIG. 22. In this state, the key 18 is withdrawn from the key hole 16a of the lock 16. Then, the worker turns the opening/closing door D to open the doorway and enters the working space S.

With the safety switch according to the invention, the closing piece which is necessary for the prior-art safety device and the locking mechanism (padlock) for locking the closing piece in the closing position are unnecessary. The parts are few for the safety switch and the cost can be reduced. The switch is useful to a safety switch or the like for stopping driving of a machine when the switch senses opening of an opening/closing door for opening and closing a doorway that allows entry into a working space where the machine is disposed.

What is claimed is:

1. A safety switch comprising: an actuator provided to an opening/closing door for opening and closing a doorway of a working space where a machine is disposed and a door switch provided to an edge portion of the doorway and having a connection contact of a switch portion which is switched in response to entry of the actuator into an operating portion to allow operation of the machine when the opening/closing door closes the doorway,
   wherein the safety switch includes: a slider for reciprocating toward the door switch while retaining the actuator to cause the actuator to enter the operating portion and to withdraw the actuator from the operating portion; and
   a slide key device integrally formed of a slider movement preventing member for controlling movement of the slider and a lock for controlling the slider movement preventing member by operating a key, and
   wherein the slide key device is configured to select movement prevention for preventing movement of the slider with the slider movement preventing member by operating the lock with the key or cancellation of the movement prevention.

2. The safety switch according to claim 1, wherein the slide key device allows withdrawal of the key from the lock only in the state of movement prevention.

3. The safety switch according to claim 2, wherein the slider has a slider fitting portion at its tip portion, and the slide key device has a guide provided to the door switch and having a fitting hole portion and the lock provided to the guide, and wherein the lock rotatably retains a slide lock as the slider movement preventing member at its movable portion, and is configured to rotate the slide lock in the fitting hole portion by rotating operation of the key inserted into a key hole of the lock to change a shape of the fitting hole portion to thereby select fitting of the slider fitting portion into the fitting hole portion or prevention of the fitting and to allow the key to be withdrawn only in the case of prevention of the fitting of the slider fitting portion.

4. The safety switch according to claim 3, wherein the slider fitting portion is formed with an interference protrusion inserting portion along a slider moving direction, the slide lock is provided with the interference protruding portion, and the interference protruding portion is positioned in the interference protrusion inserting portion when the slider fitting portion is fitted into the fitting hole portion to prevent rotation of the slide lock to thereby make withdrawal of the key impossible.

5. The safety switch according to claim 2, wherein the slider is movably retained on a slide base in the slider moving direction, and the slide key device has: the lock provided to the slider; a lock lever as the slider movement preventing member coupled to a movable portion provided to the lock; and a lever engaging portion which is provided to the slide base and with which the lock lever is detachably engaged, and wherein the lock is configured to rotate the lock lever by rotating operation of the key inserted into a key hole of the lock to detachably engage the lock lever with or from the lever engaging portion to thereby select locking of the slider or cancellation of the locked state and to allow the key to be withdrawn only in the case of locking of the slider.

6. The safety switch according to claim 5, wherein the slide base is provided with a sliding recessed portion along the slider moving direction, the lever engaging portion is connected to a side face side of the sliding recessed portion, the slider is provided at its back face with a recessed portion, the lock lever is positioned in the recessed portion, the slider is movably inserted into the sliding recessed portion to cause the slide base to retain the slider, and the lock lever is positioned in the sliding recessed portion when the actuator enters the operating portion due to movement of the slider to prevent rotation of the lock lever to thereby make withdrawal of the key impossible.

7. The safety switch according to claim 2, wherein the slider is movably retained on a slide base in the slider moving direction, and the slide key device has: the lock provided to the slide base; a lock lever as the slider movement preventing member coupled to a movable portion provided to the lock; and a lever engaging portion which is provided to the slider and with which the lock lever is detachably engaged, and wherein the lock is configured to rotate the lock lever by rotating operation of the key inserted into a key hole of the lock to detachably engage the lock lever with or from the lever engaging portion to thereby select locking of the slider or cancellation of the locked state and to allow the key to be withdrawn only in the case of locking of the slider.

8. The safety switch according to claim 7, wherein the slide base is provided with a sliding recessed portion along the slider moving direction, the slider is movably inserted into the sliding recessed portion to cause the slide base to retain the slider, the slide base is formed with a lock mounting portion, a lever housing portion is provided in the lock mounting portion, the lock is mounted to the lock mounting portion, the lock lever is housed in the lever housing portion, and the lock lever is caused to interfere with the slider to prevent rotation of the lock lever to thereby make withdrawal of the key impossible when the lock lever is detached from the lever engaging portion and the actuator enters the operating portion due to movement of the slider.

* * * * *